United States Patent [19]

Custer

[11] Patent Number: 5,353,744
[45] Date of Patent: Oct. 11, 1994

[54] ANIMAL CONTROL APPARATUS

[75] Inventor: Daniel A. Custer, Southborough, Mass.

[73] Assignee: Dogwatch, Inc., Wayland, Mass.

[21] Appl. No.: 79,205

[22] Filed: Jun. 16, 1993

Related U.S. Application Data

[63] Continuation of Ser. No. 998,878, Dec. 29, 1992, abandoned, which is a continuation of Ser. No. 884,843, May 13, 1992, abandoned, which is a continuation of Ser. No. 700,015, May 14, 1991, abandoned.

[51] Int. Cl.$^5$ ............................................. A01K 15/04
[52] U.S. Cl. ................................. 119/719; 119/721; 119/908; 340/870.09; 340/573
[58] Field of Search ............... 119/29, 106, 719, 720, 119/721, 908; 340/573, 870.09, 870.28

[56] References Cited

U.S. PATENT DOCUMENTS

| | | | |
|---|---|---|---|
| 3,589,337 | 6/1971 | Doss | 119/29 |
| 3,753,421 | 8/1973 | Peck | 119/29 |
| 3,777,712 | 12/1973 | Gardner et al. | 119/29 |
| 3,980,051 | 9/1976 | Fury. | |
| 4,136,338 | 1/1979 | Antenore | 340/573 X |
| 4,335,682 | 6/1982 | Gonda et al.. | |
| 4,630,571 | 12/1986 | Palmer. | |
| 4,733,633 | 3/1988 | Yarnall, Sr. et al.. | |
| 4,745,882 | 5/1988 | Yarnall, Sr. et al. | 119/29 |
| 4,766,847 | 8/1988 | Venczel et al. | 340/573 X |
| 4,802,482 | 2/1989 | Gonda et al.. | |
| 4,887,549 | 12/1989 | Powell | 119/29 |
| 4,898,120 | 2/1990 | Brose | 340/573 X |
| 5,046,453 | 9/1991 | Vinci | 119/29 |
| 5,054,428 | 10/1991 | Farkus | 119/29 |
| 5,068,642 | 11/1991 | Hruby et al. | 340/573 |

FOREIGN PATENT DOCUMENTS 2455843  1/1981  France ................ 119/29

Primary Examiner—Gene Mancene
Assistant Examiner—Todd E. Manahan
Attorney, Agent, or Firm—Hamilton, Brook, Smith & Reynolds

[57] ABSTRACT

An apparatus for confining the movement of an animal to a defined area includes a transmitter that generates a continuous, coded radio signal through an antenna defining the area. The transmitter can variably modify the amplitude of the continuous, coded radio signal and variably modify the code of the continuous, coded radio signal, thereby modifying the type and rate of a stimulus provided to the animal. The apparatus also has a portable radio receiver for detecting the amplitude of the continuous, coded radio signal and for decoding the continuous, coded radio signal for the rate and type of stimulus provided to the animal. The portable radio receiver is attached to the animal and is positioned for delivering the stimulus to the animal in response only to the detected continuous, coded radio signal.

16 Claims, 8 Drawing Sheets

ANIMAL CONTROL APPARATUS

This is a continuation of co-pending application Ser. No. 07/998,878 filed on Dec. 29, 1992, now abandoned, which is a file wrapper continuation of Ser. No. 07/884,843, which was filed on May 13, 1992, now abandoned, which is a file wrapper continuation of Ser. No. 07/700,015, which was filed on May 14, 1991, now abandoned.

BACKGROUND OF THE INVENTION

This invention relates to apparatus for confining the movement of animals, and particularly to apparatus for limiting the range of movement of an animal to a space within a defined boundary.

In one known approach to discouraging an animal from leaving a prescribed area, an aversive stimulus such as an electric shock is delivered to the animal whenever the animal approaches the perimeter of the prescribed area. One sort of apparatus for this approach includes a radio transmitter and a radio frequency receiver, carried by the animal, that includes electrodes for delivering an electric shock to the animal's skin; electronic circuitry in the receiver causes delivery of the electric shock in response to a signal from the transmitter. The transmitter can be configured to send the signal through a closed wire loop, which can be arranged about the perimeter of the prescribed area to form a so-called "invisible fence". Whenever the animal approaches within the field surrounding the wire loop, the receiver is triggered to deliver the aversive shock, from which the animal escapes by returning to within the prescribed area.

Radio frequency interference from a variety of sources in and around the domestic site can trigger the aversive shock stimulus, causing needless discomfort to the animal and breaking down the animal's specific conditioned response to the perimeter wire, compromising the effectiveness of the apparatus.

SUMMARY OF THE INVENTION

In one general aspect the invention features apparatus for confining the movement of an animal to a defined space, the apparatus including a radio frequency transmitter including a perimeter wire to be placed at the boundary of the defined space and circuitry for sending a coded signal through the perimeter wire to generate a coded field, and a receiver including means responsive to the coded field for delivering an aversive stimulus to the animal, the receiver having means for arresting delivery of the aversive stimulus upon detection of a signal other than a coded signal.

In preferred embodiments the sending circuitry sends a signal made up of a series of bursts of pulses; the bursts occur at a repetition rate, and the stimulus delivering means delivers an aversive stimulus in response to each such burst; each such burst has a burst length, and the delivery arresting means arrests delivery of the aversive stimulus following detection of a signal having a duration longer than the burst length.

The invention provides apparatus for effectively confining an animal to a prescribed space, in which delivery of an aversive stimulus by the system receiver is arrested whenever the receiver detects most commonly encountered radio frequency signals other than those generated by the system transmitter. As a result the aversive stimulus, which may be an electric shock stimulus, is delivered to the animal substantially only when the animal crosses into a zone within the field surrounding the boundary wire, and substantially not when the animal approaches close to a source of interfering radiation. Unnecessary and excessive discomfort to the animal is minimized, and the animal's conditioned response to the boundary of the prescribed space is not compromised.

The embodiments described in detail below and shown in the FIGS. are presented for illustration and, as will appear from the description, apparatus and methods for use that differ in particulars are within the scope of the invention.

DETAILED DESCRIPTION

Animal control apparatus of the invention is constructed to provide a receiver, carried by the animal, that delivers an aversive stimulus to the animal whenever the receiver detects a coded radio frequency signal in the field surrounding the boundary wire of the transmitter. The signal generating circuitry of the transmitter, operating from line current, sends a coded AM radio signal through the loop antenna.

In some embodiments, as described in more detail below, the range of the field can be adjusted to increase or decrease the distance from the boundary wire at which a threshold for detection by the receiver is reached. The state of the configuration of the signal (that is, the code) sent by the transmitter circuitry through the boundary wire can be selected, to provide for different responses by the receiver; in preferred embodiments the receiver's capacity to deliver an aversive stimulus is disabled when the receiver detects interfering signals. In some embodiments the receiver is capable of delivering either an audible signal alone, or an audible signal followed shortly by an aversive electric shock.

Once the code has been selected, the coded signal is continuously sent through the boundary wire as long as the transmitter power is on, setting up a continuous coded field in the vicinity of the wire at the boundary of the prescribed space. The system may thereafter be left unattended. The space established by the field within the threshold distance from the wire provides a zone of avoidance; the receiver delivers the aversive stimulus to the animal whenever and as long as the animal is within the zone, and ceases delivering the aversive stimulus when the animal moves back within the prescribed space to escape the zone.

General

Figure 1A:
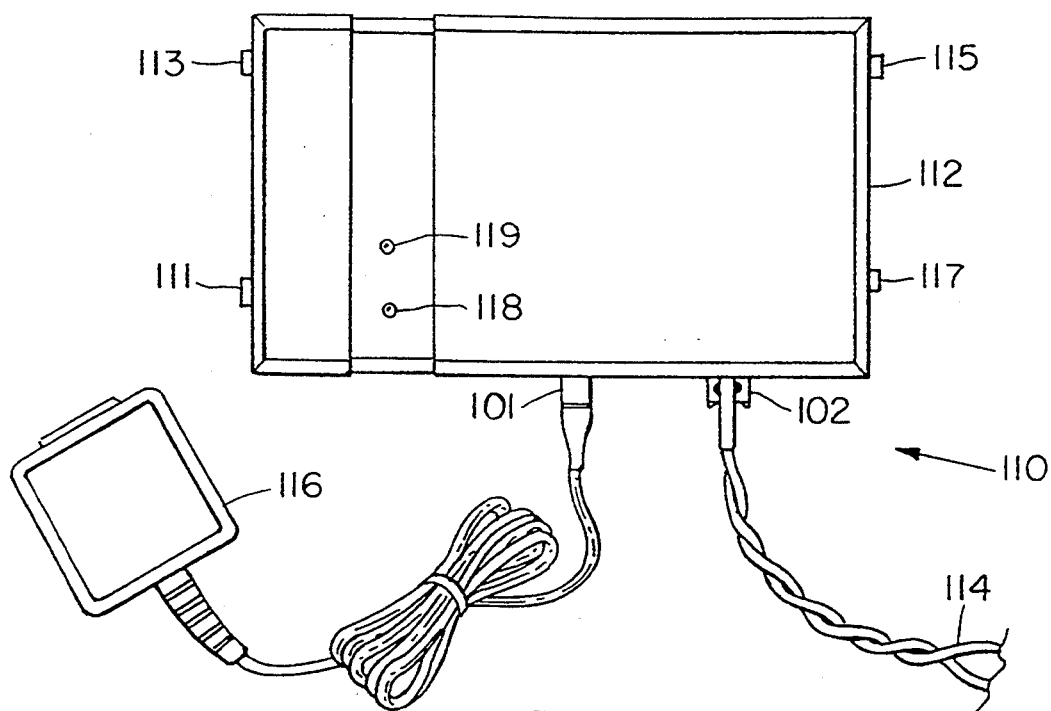
FIGS. 1A and 1B are drawings in perspective view of animal control apparatus according to the invention, showing (FIG. 1A) a transmitter, adapted for operation on a standard 110 volt outlet, and (FIG. 1B) a receiver, adapted to be worn about the animals neck.
Figure 1B:
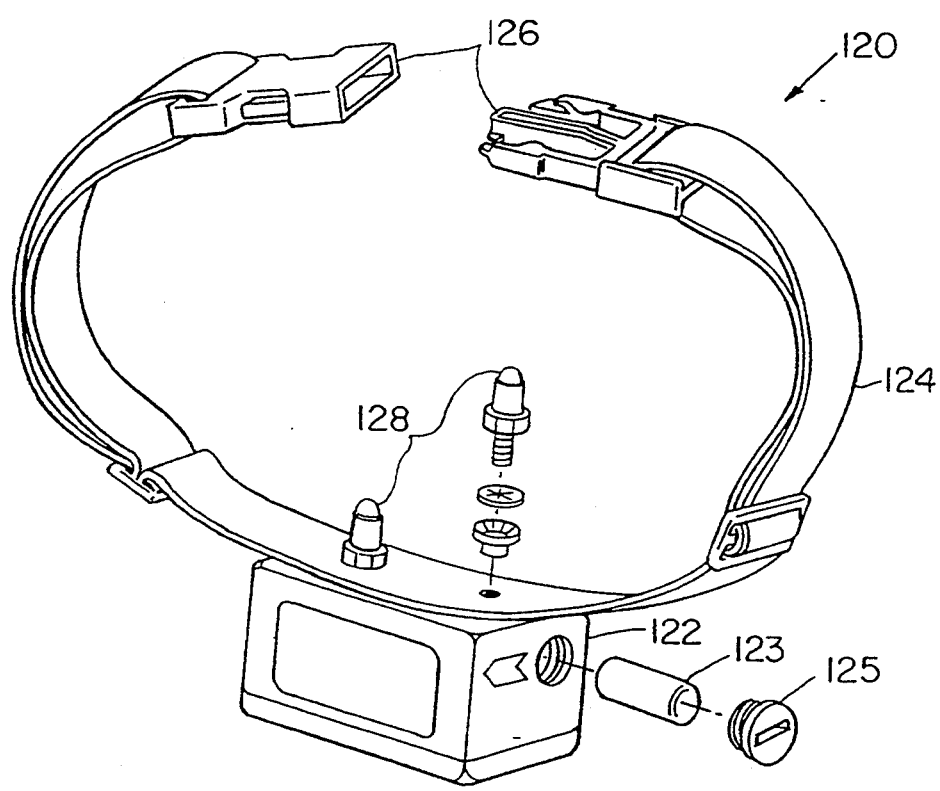

Referring to FIGS. 1A and 1B, the apparatus consists generally of a transmitter, shown generally at 110 (FIG. 1A), and a receiver, shown generally at 120 (FIG. 1B).

Transmitter 110 includes electronic circuitry contained in an enclosure 112, which supplies bursts of approximately 8 kHz pulses into a closed loop of wire, shown in part at 114 leading away from enclosure 112. The transmitter 110 is provided with a standard alternating current adapter 116 so that it can be powered by connection to a standard 110 volt outlet. The A/C adapter 116 is provided with a plug 101 for connection to a power supply jack on the transmitter enclosure. Wire 114 is provided at one end with a plug 102 for connection to a loop wire jack on the transmitter enclosure. Preferably a braided connecting portion of the loop wire 114 leads from plug 102 to the boundary portion of the loop wire. The boundary portion of the loop wire (not shown in FIG. 1A) is arranged on the periphery of the space within which the animal is to be confined (or from which the animal is to be excluded), establishing the boundary of the prescribed space. The transmitter enclosure 112 is provided with a power source on/off switch 111; a shock stimulation rate selector switch 113, which provides for delivery to the animal of either slow or medium or fast shock rates; a mode selector switch 115, which provides for delivery to the animal (in the "on" mode) of an audible warning followed by an electric shock stimulation or (in the "off" mode) of an audible warning only; and a range adjuster 117, which provides for adjustment of the strength of the signal field, to increase or decrease the effective width of the zone around the loop wire in which the field is sufficiently strong to activate the receiver. A power indicator light 118 on the front panel of the transmitter enclosure lights when the transmitter is correctly connected to line current through the A/C adapter, the on/off switch is "on", and power is operational. The range can be adjusted for distances between about 3 and 12 feet by turning the range adjuster 117 in one direction ("+") to widen the signal field, and in another direction ("−") to narrow it.

When the transmitter 110 is connected to a power source and the power source on/off switch 111 is "on", a signal consisting of a series of bursts of pulses, whose parameters can be set (as described with reference to FIG. 2 below) using the selectors 113, 115, 117, is continually delivered through the closed loop, which acts as a transmitting antenna to produce a continuously amplitude-modulated field about the wire loop. Once the boundary wire has been properly installed and plugged into the transmitter, and so long as there is electrical continuity throughout the loop, a loop indicator light 119 lights; if electrical continuity in the boundary wire is broken or if the signal is interrupted, the loop indicator light goes out and an audible alarm sounds.

The receiver 120 includes electronic circuitry contained in an enclosure 122, which is affixed to a length-adjustable strap 124. The strap 124 is provided with a clasp or buckle 126, so that the receiver 120 can be removably mounted onto the animal by encircling the animal's neck with the strap, adjusting the length, and joining the clasp. Electrodes 128 protrude from receiver enclosure 122 so that when the receiver 120 is so mounted on the animal, the electrodes 128 press against the animal's skin to deliver a shock stimulus to the animal upon activation by the circuitry. Receiver 120 is additionally provided with a small loudspeaker (not shown in FIG. 1B) to deliver an auditory stimulus to the animal. The receiver is powered by a replaceable battery pack 123, held in place by retainer 125.

As the animal approaches the boundary formed by the closed wire loop, an antenna within the receiver 120 detects the field generated about the loop by the transmitter and the receiver circuits process the antenna signal and produce appropriate stimuli.

When the shock stimulation rate is adjusted to a higher setting using selector switch 113 on the transmitter, the animal receives a greater number of shock pulses per second. The optimal shock rate for a particular animal having a particular experience with the apparatus can be determined in the course of the conditioning exercises, as described below in the description of use of the apparatus. Once the optimal rate has been determined it is not thereafter adjusted and, in any event, it is ordinarily adjusted only once or a few times even during the conditioning exercises.

The mode selector switch 115 should ordinarily be switched to "off" after the animal has been thoroughly conditioned with the mode "on" and consistently responds to the audible warning alone; generally, the system should be in use by an animal for a time of a year or longer in the "on" mode before it is permitted to go to the "off" mode.

Preferably, the apparatus according to the invention can be installed even by a person having no knowledge or interest in electronics, and can be used even by a person having no experience with animal training. Preferably, the apparatus is provided to the user as a "plug and play" system designed such that any of a variety of receiver configurations according to the invention can be used together with any of a variety of transmitter configurations according to the invention.

Electrical Stimulation Regimes

Preferred apparatus according to the invention delivers aversive stimulation to the animal as a series of stimulatory pulses (auditory "beeps", electric shocks) that continues as long as the animal remains within the avoidance zone, and ceases when the animal leaves the avoidance zone. Delivery of stimulatory pulses at a higher frequency produces a "stronger" aversive stimulation, and delivery of stimulatory pulses at a lower frequency produces a "weaker" aversive stimulation.

Further, preferred apparatus according to the invention is capable of delivering either an auditory stimulation (a series of "beeps" audible to the animal) alone, or an auditory stimulation coupled with an electric shock stimulation, in which each of the series of audible beeps is followed by an electric shock.

Moreover, whatever the type of aversive stimulus delivered, apparatus according to the invention is capable of arresting or interrupting the delivery of the stimulus whenever the receiver detects that an incoming signal is not a signal characteristic of the coded transmission signal. In particular, preferred apparatus disables delivery of the aversive stimulus after the first stimulatory pulse whenever the incoming signal has a duration longer than a set maximum pulse duration. Because most radio frequency signals likely to be interfering that are commonly encountered in the domestic setting are effectively continuous-wave, aversive stimulation (beyond the initial beep or shock) resulting from the animal's proximity to sources other than the boundary wire is thereby avoided.

Figure 2:
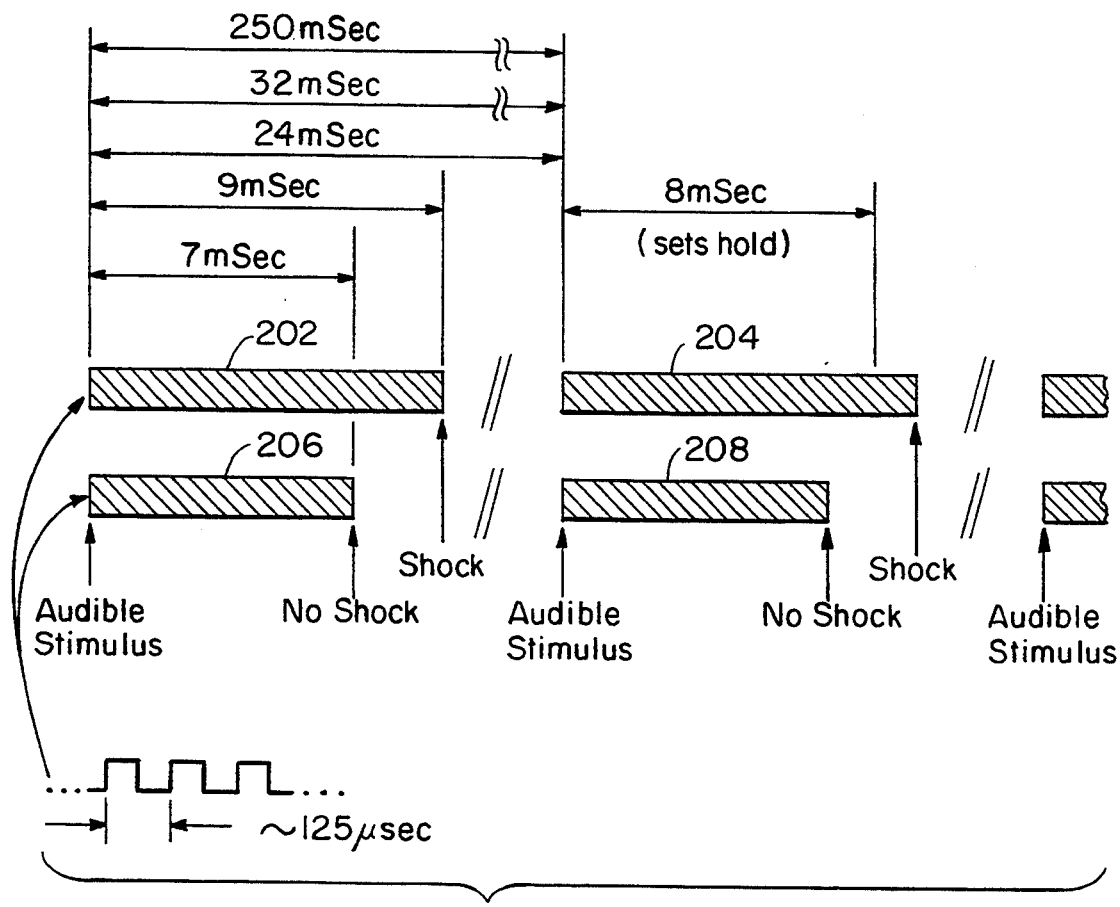
FIG. 2 is a graphical representation illustrating electrical stimulation regimes selectably generatable by animal control apparatus according to the invention.

FIG. 2 illustrates particular stimulation regimes that can be generated by the transmitter and receiver system illustrated in FIGS. 5 and 6, described in detail below. FIG. 2 shows, on a time line running from left to right, two successive bursts of pulses received at the receiver antenna above the threshold when the transmitter is set in the "on" mode (bursts 202, 204) and in the "off" mode (bursts 206, 208). Bursts 202 and 206 may be the initial bursts received above threshold; that is, they may be the first bursts received as the animal crosses into the avoidance zone, and further bursts above threshold beyond the two shown here will be received until the animal leaves the avoidance zone and the signal falls below the threshold.

Figure 5A:
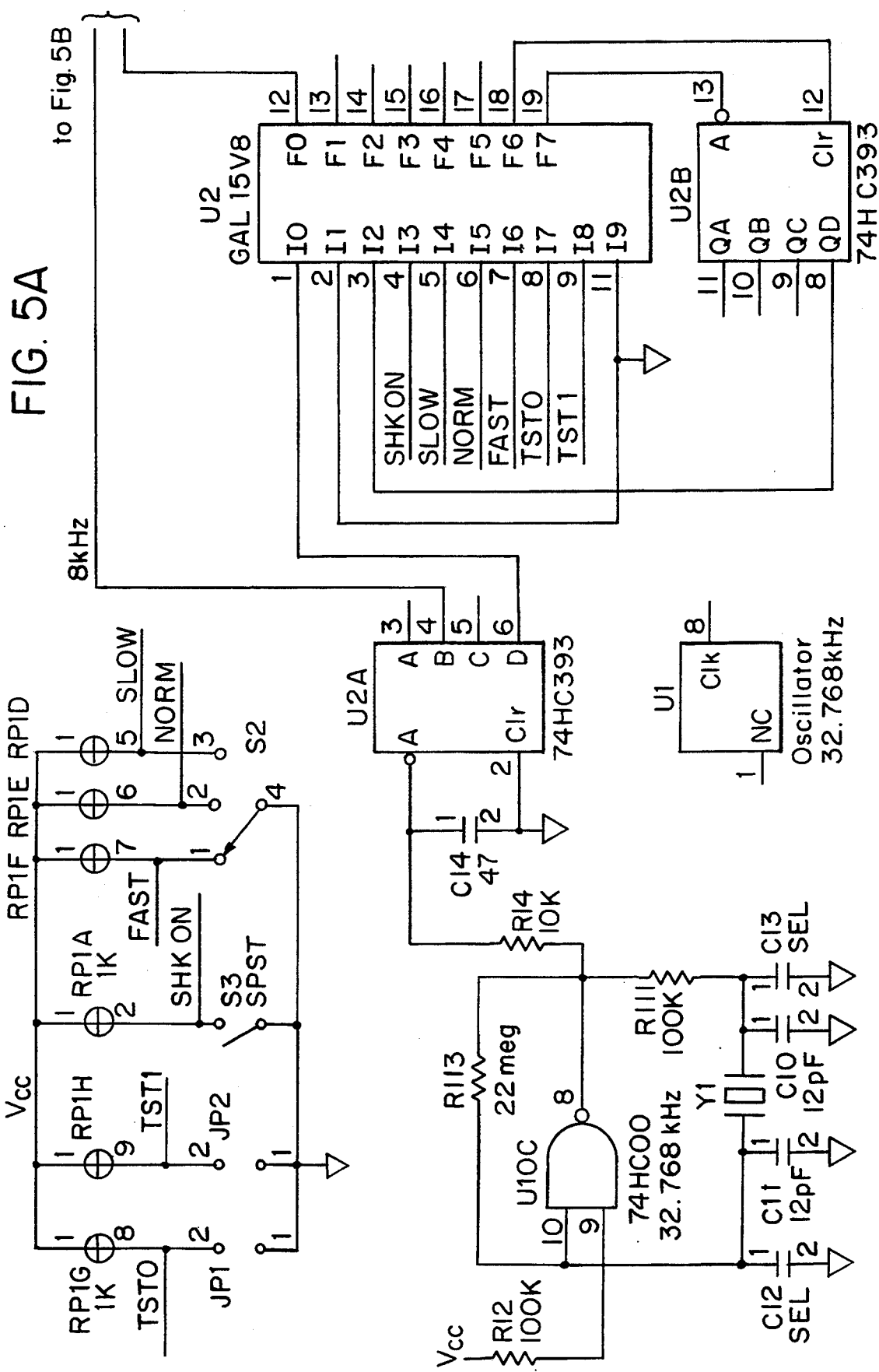
FIG. 5 is a schematic showing electronic circuitry of the transmitter apparatus of FIGS. 1A and 3.
Figure 5B:
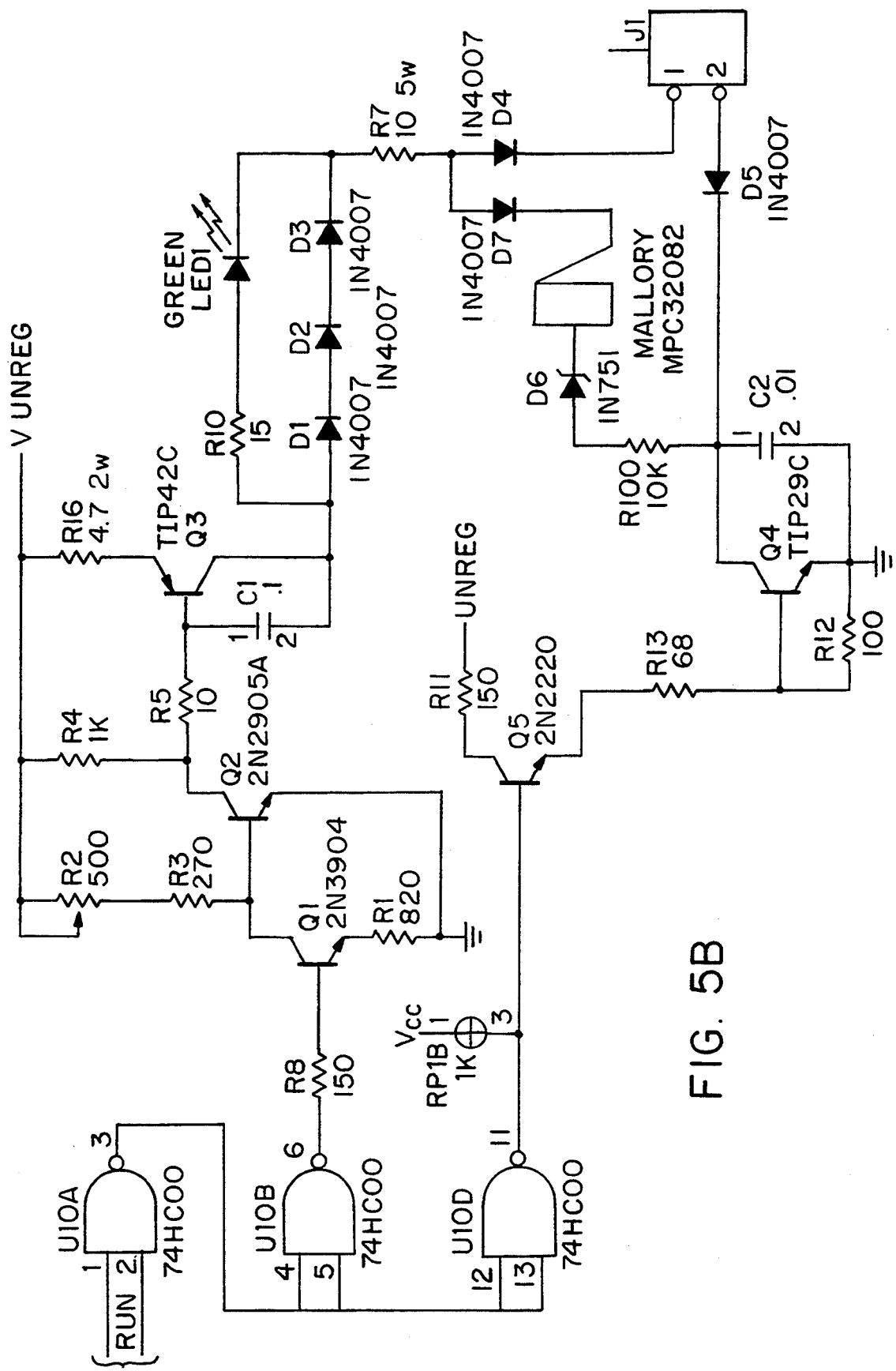
Figure 5C:
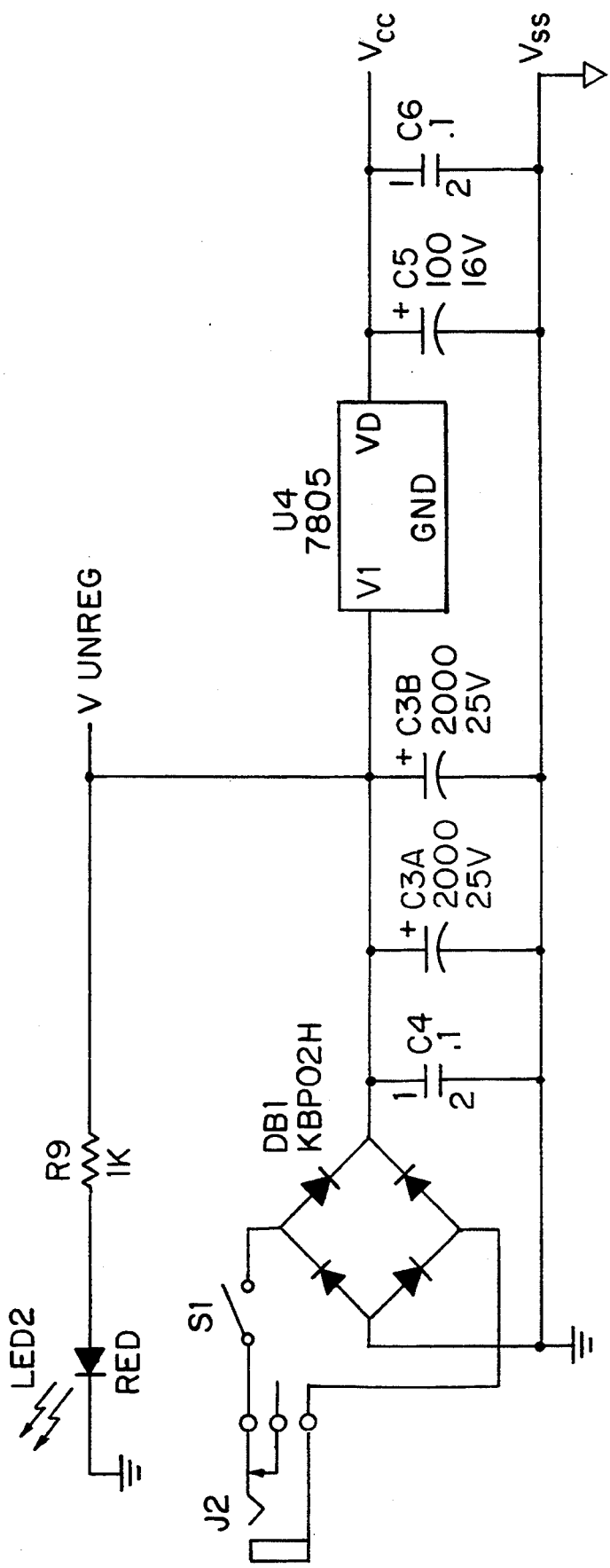

Each burst is an envelope of pulses having a period about 125 μmSec (in the circuitry shown in FIG. 5 the frequency is slightly higher than 8 kHz, as the oscillator divides a standard watch crystal oscillation (about 32.768 kHz) by four). In the embodiment shown, the burst has a length about 7 mSec in the "off" mode, and about 9 mSec in the "on" mode. The burst frequency may be set to send the bursts at intervals of about 250 mSec (in the "slow" repetition rate setting), or about 32 mSec (in the "medium" repetition rate setting), or about 12 mSec (in the "fast" repetition rate setting). As the receiver detects the initiation of an incoming signal above threshold, the receiver circuitry causes an audible beep to be produced by the loudspeaker; thereafter, in mode "off", the coded burst ceases at a burst length of about 7 mSec, and no shock stimulation is delivered. After the repetition rate interval has passed (250 mSec, 32 mSec, or 12 mSec), if the animal has not yet escaped the avoidance zone, a next succeeding coded burst will be detected and the receiver circuitry will cause a succeeding audible beep (but, in "off" mode, no shock). The receiver will in this way continue to deliver a series of audible beeps until the animal leaves the avoidance zone and the received signal falls below threshold, and then the stimulation will cease.

In the "on" mode, each coded burst continues for about 9 mSec, and the receiver responds to such longer bursts by delivering a shock to the animal following each audible beep.

If, on the other hand, a signal is received above threshold that substantially exceeds the "on" mode burst length (as may occur when the animal approaches close enough to an interfering source that generates an effectively continuous-wave signal), an initial audible beep will be delivered as the signal is first detected, followed (if the transmitter is set in "on" mode) by an initial shock as the signal exceeds a duration of about 8 mSec (initially seen by the receiver as an "on" mode burst); but thereafter the receiver will recognize that the signal duration exceeds a coded burst length, and the circuitry will disable the stimulus delivery so that no further audible beep (or audible beep followed by shock) is delivered to the animal. Then, when the animal moves sufficiently far away from the interfering source that the signal falls below threshold, the system is again enabled and ready to detect an incoming signal above threshold.

Illustrative circuitry that can produce such stimulation regimes is described in further detail below, with reference to FIGS. 3-6.

Transmitter

Generally, the transmitter circuits send a coded AM signal through the wire loop, generating a corresponding coded AM radio frequency field near the wire loop. In preferred embodiments, the signal consists of a series of bursts of pulses; the rate of repetition of the bursts and the frequency of the pulses in the bursts and the length of the bursts can be selected, and the receiver delivers an aversive stimulus to the animal whose strength (frequency of stimuli) is related to the burst repetition rate and whose type (auditory, shock) is related to the burst length.

Figure 3:
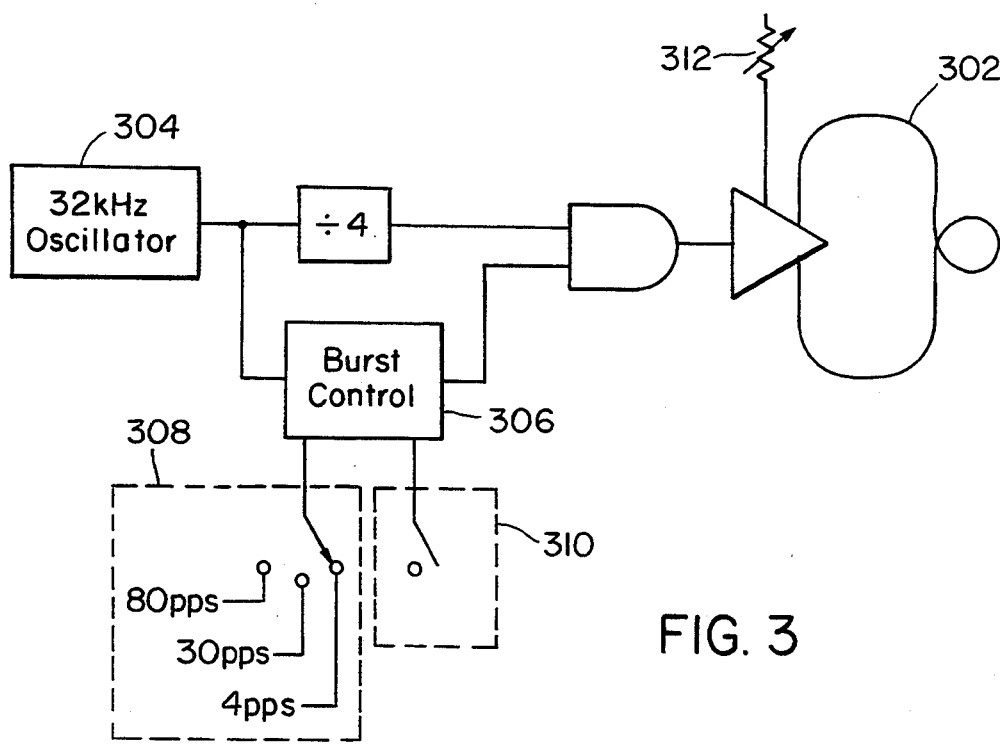
FIG. 3 is a block diagram showing the electronic operation of the transmitter of the animal control apparatus of FIGS. 1A and 1B.

Referring now to FIGS. 3 and 5, the transmitter includes a wire loop 302, to be installed around the perimeter of the space within which the animal is to be confined, that acts as a transmitting antenna which is driven by circuitry that sends a coded signal through the wire. The transmitter circuitry includes an oscillator 304, burst control circuitry 306 controlled by pulse repetition rate selector 308 and burst length selector 310; and field strength (loop current) adjustment means, indicated at 312.

Receiver

Generally, the receiver circuits detect and process two sorts of information, namely the amplitude of the antenna signal and the length of the burst of pulses (or the number of pulses contained in a burst). The antenna signal amplitude determines whether the receiver responds to the received burst by delivering an aversive stimulus to the animal.

The amplitude of the antenna signal depends upon the strength of the loop current and the distance between the signal carrying wire and the antenna; for a given loop current value, if the amplitude (and, hence, the distance) is greater than a set threshold amount, the receiver should not deliver any stimulus to the animal.

In preferred embodiments the receiver is capable at any given time of delivering any of a variety of stimulus types in any of a range of strengths, depending upon the length of the burst of pulses transmitted at the wire loop. If the antenna signal amplitude is sufficiently great (that is, above the threshold) to elicit a receiver response, then the type of the response depends upon the length of the burst, that is, upon the number of pulses in each burst. In a most prefected embodiment, the receiver can deliver an audible stimulus through a loudspeaker located in the receiver, or an electric shock stimulus, and the electric shock stimulus is delivered as a rapid series of electric shocks. The electric shock stimulus is produced in a range of strengths by delivering the shocks in the stimulus series at greater or lesser shock frequencies.

In some embodiments the electrical shock stimulus is delivered through contact posts that project from the receiver enclosure toward and against the animal's skin. Preferably the contact posts are provided in two or more lengths, readily interchangeable, to provide adequate with the animal's skin through thicker or thinner fur.

The configuration of one most preferred embodiment is as follows. The transmitter can generate bursts at frequencies (repetition rates) of four bursts per second ("low"), or 30 bursts per second ("medium"), or 80 bursts per second ("high"); and can transmit pulses in burst lengths of about 7 mSec (in "off" mode) or about 9 mSec (in "on" mode).

In preferred embodiments the receiver, including the source of power to drive the electrical stimuli, is small, lightweight and attractive, as it must be carried by the animal. In some embodiments the receiver is affixed to an adjustable nylon collar, to be worn about the animal's neck.

Moreover, the receiver is capable of distinguishing at least some commonly encountered signals in the system frequency range that are not produced by the system transmitter, and is capable of producing no stimulus to the animal in response to such interfering signals.

The receiver, including the shock delivery driver, is powered by a long life battery pack. In one preferred embodiment the receiver power source is five 175 mAmp-Hr 357 cells in series. Preferably the battery life in a no signal environment is as long as the greater part of a year's time; a battery pack of five 357 cells has a life in this system of approximately 9 months in a no signal environment, approximately 25 µAmp drain.

If the receiver is in a field, whether produced by the system transmitter or by an interfering course, the battery drain increases; however, it is desirable to restrict the increase in current to as low a value as practical especially in an interfering field.

Preferably the receiver is electronically disabled when an interfering signal is detected, so that current drain is diminished while the animal is in an interfering field. When the animal carries the receiver beyond the detectable range of the interfering signal, it becomes re-enabled and resumes operation.

It is practically difficult to filter out interference completely while staying within preferred system specifications for power, size, and low cost criteria. The largest commonly encountered sources of interference are television receivers. The frequency is 15.75 kHz, and the amplitude has been observed to be as much as 80 dB louder than a system transmitter signal. Appliances containing a phase controlled power supply are another source of interfering signals, broadcasting harmonics of 60 Hz. Because these most commonly encountered interfering signals are effectively continuous wave, the apparatus in preferred embodiments employs circuitry that disables the counter clock whenever a long burst length is detected (greater than 8 mSec, in one embodiment), in addition to some filtration.

In preferred embodiments, a continuity tester such as a test light is provided for testing the receiver's capacity to deliver an adequate shock stimulus. The user holds contact points on the test light over the contact posts, and then carries the receiver into the signal field. When the receiver picks up the signal from the boundary wire, the audible warning sounds at the receiver loudspeaker and the test light lights.

Figure 4:
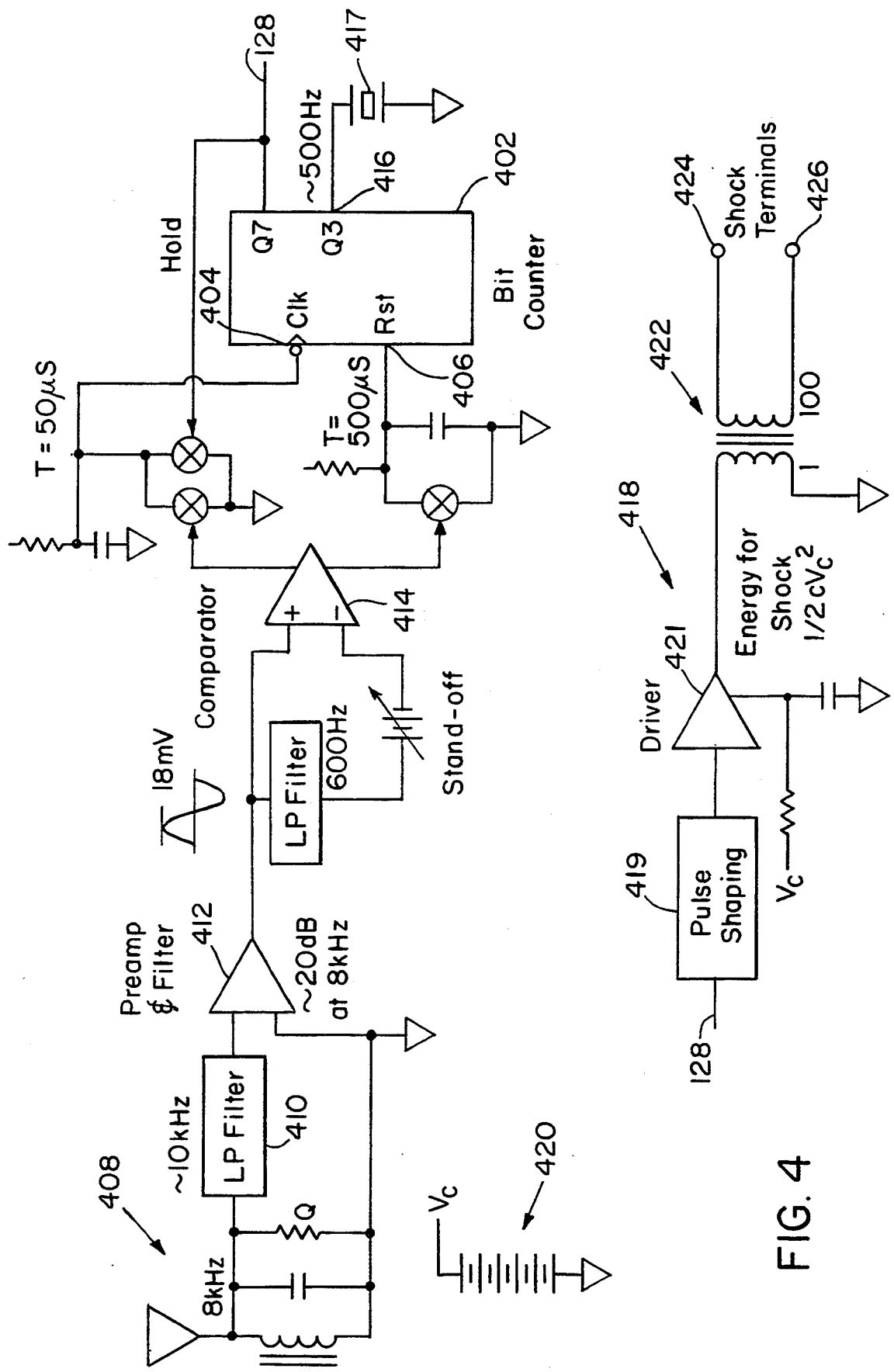
FIG. 4 is a block diagram showing the electronic operation of the receiver of the animal control apparatus of FIGS. 1A and 1B.
Figure 6A:
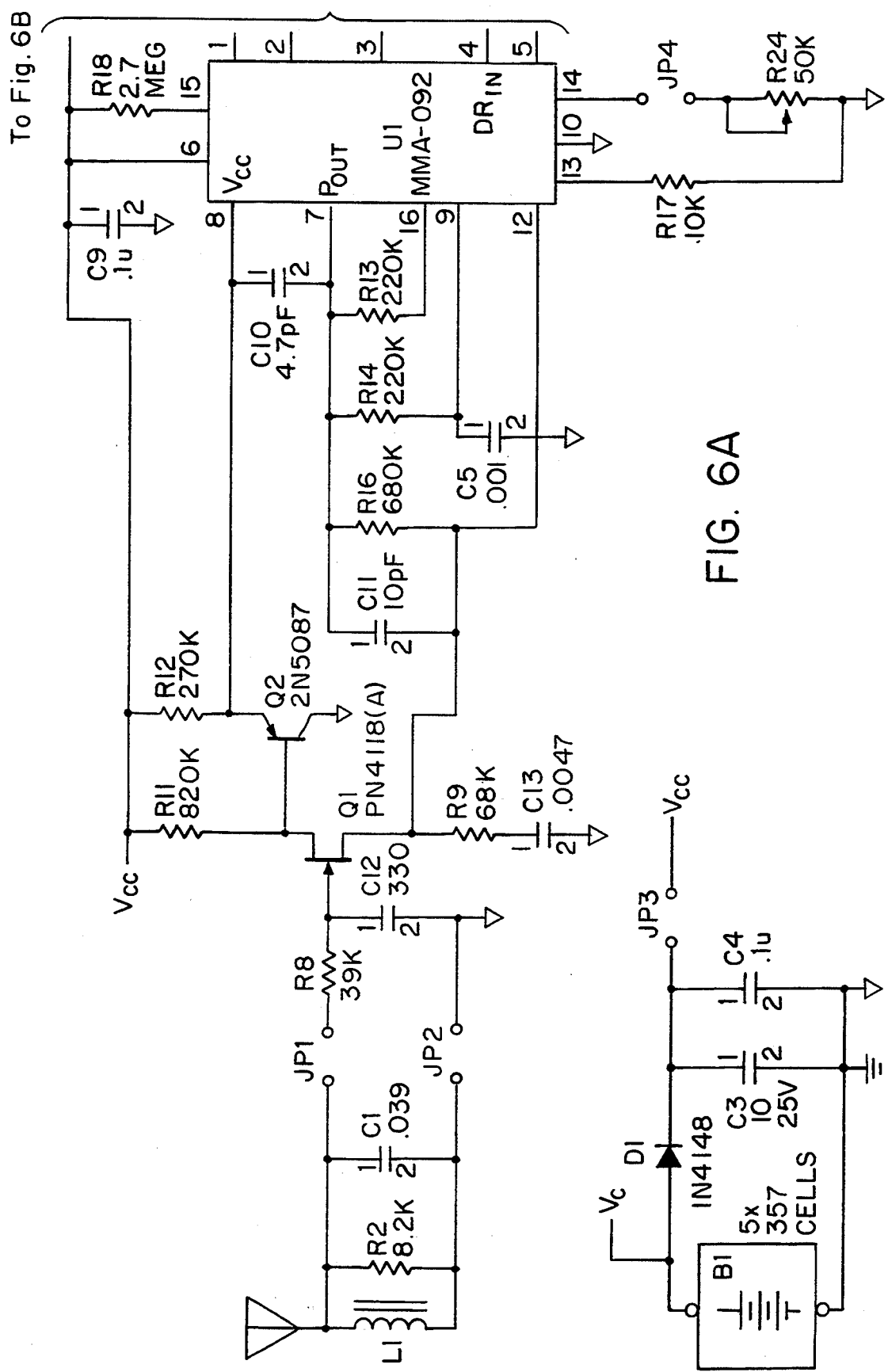
FIG. 6 is a schematic showing electronic circuitry of the receiver apparatus of FIGS. 1B and 4.
Figure 6B:
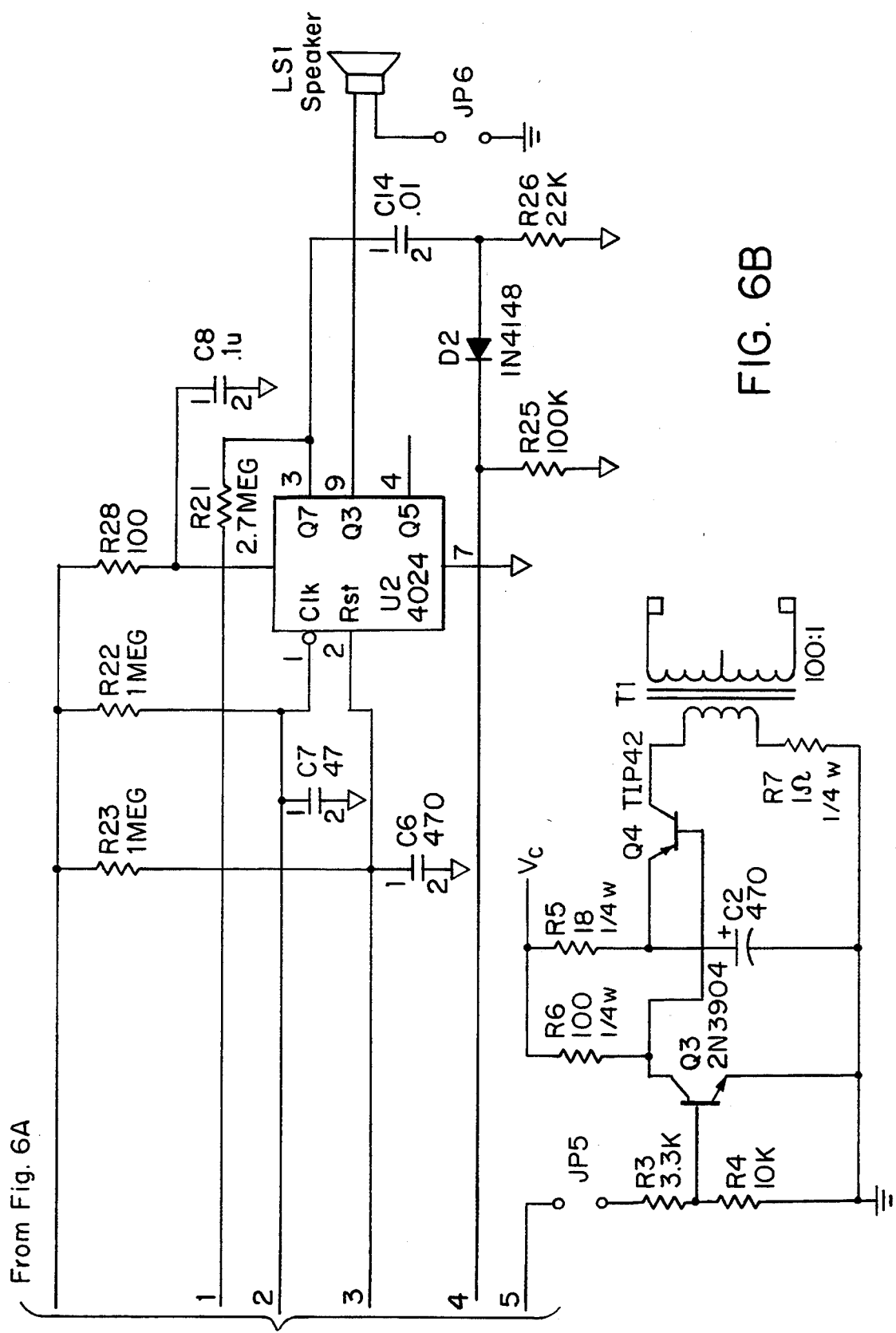

With reference now to FIGS. 4 and 6, the receiver circuitry includes a counter 402, a circuitry portion (generally to the left of counter 402 in the FIGS.) that conditions the antenna voltage, and circuitry portions responsive to the counter state that deliver one or more stimuli to the animal. Counter 402 is a 7 bit ripple counter having two inputs 404 ("clock"), 406 ("reset"). The antenna signal is resonated in a parallel circuit, shown generally at 408 with a Q of ten; under these conditions an 8 kHz input signal at maximum detectable range is about 6 to 8 mV p-p. The antenna voltage increases with frequency, so the first lowpass filter 410 merely compensates for that effect.

The output of the low pass filter 440 drives a J-FET input preamplifier 412 with a gain of about 20 dB at about 8 kHz. The amplifier is configured as a band pass filter and provides further high frequency attenuation for 2 decades. In addition to amplifying the signal voltage the pre-amp generates a bias voltage of approximately 3V.

The amplified signal voltage and bias is applied to one input of comparator 414. A filtered signal is applied to the other input of comparator 414, so that only the bias voltage appears on that terminal. At no signal the current in the comparator input pair is unbalanced by two or three emitters resulting in 18 to 30 mV stand-off voltage. In this state both switches are open.

As the signal rises to a value in excess of the stand-off voltage, base current is supplied to both switches and they close. The switch closures disable the counter reset and clock the counter. When the switches reopen the voltage rise on the counter input terminals 404, 406 are controlled by the time constant of the components connected to the counter terminals. The reset will not rise to threshold, assert reset for approx 0.6 mSec, so that the counter increments as long as fast clocks appear. The counter clocks low and the clock input must return high to enable the next count. As a result high frequencies can be rejected by picking time constants on the clock for clock input that will not allow the terminal to rise past threshold. In addition, a pulse stream that sets Q7 (64 qualified pulses) disables the clock input until the reset input is asserted.

Counter output Q3 416 drives a piezoelectric loudspeaker 417, and counter output Q7 activates the shock delivery means, shown generally at 418. The shock delivery means includes pulse shaping circuitry 419 and a driver circuit 421, energized by a battery pack 420, connected to the primary coil of step-up transformer 422. The secondary coil of transformer 422 is connected to the shock terminals 424, 426, which deliver the shock stimulus to the animal.

Installation and Use

The apparatus according to the invention can be made, as illustrated for example in the embodiments described with reference to the FIGS., as a "plug and play" system, not requiring any understanding of electronics by the user. Mounting the receiver is practically as simple and straightforward as placing a collar on the animal. Installation of the transmitter is accomplished by arranging the wire loop about the perimeter of the space within which (or from which) movement of the animal is to be restricted, connecting the transmitter to a standard electrical outlet, setting signal parameters using switches and selectors on the transmitter enclosure as appropriate to the behavior of the animal, as described generally below, and switching the power switch to "on". The user need give no further attention to the system or to the movements of the animal within the space once the system is set up and operating.

The following, for illustration, is a recommended procedure for installation of apparatus according to the invention. This example shows installation of apparatus as described and shown with reference to the FIGS. for use in limiting the movement of a domesticated animal such as a dog within a circumscribed area of a domestic yard space.

Installation

Transmitter. The transmitter should be located close to a standard 110 volt electrical outlet in an area that is protected from weather, such as in a garage, basement, house or barn. Preferably the transmitter enclosure is provided with mounting brackets or screws for stable installation. The wire loop connector preferably passes from a plug in the transmitter enclosure out through a hole drilled in the outside wall of the building in which the transmitter enclosure is installed.

Grounding Rod and Lightning Arrestor. The grounding rod and the lightning arrestor preferably are positioned wall near the point where the transmitter is installed. The lightning arrestor can, if convenient, be attached to the existing "house ground"; the grounding rod should be buried in the ground, leaving approximately 12 inches of rod exposed. The lightning arrestor can be connected to the grounding rod at a point 4–6 inches off the ground using the fastening straps. The grounding clamp can be attached to the grounding rod, below the lightning arrester, and the ground wire run from the lightning arrestor to the grounding clamp.

The boundary wire is connected to the loop connector, and the boundary wire is installed around the perimeter of the space as described below.

Boundary wire. The wire loop must form a continuous boundary, and sharp bends should be avoided, as irregular radio signals may be result at such points; similar alleys or bottlenecks, in which the wire encloses a narrow space (less than about 10 feet wide for the electronic configuration shown in the FIGS.) should be avoided. The wire should never be installed in metal conduit. Using the natural boundaries of the property in establishing the location of the boundary wire can facilitate the conditioning of the animal to respect the boundary; the location of gardens, plants, pools, pathways and driveway crossings should be considered.

The wire loop should not be positioned at any point too near the wire loop in a similar animal control system in an adjoining property; a distance between wire of at least about 10 feet is preferable for the electronic configuration shown in the FIGS. Generally the boundary wire should not pass too near the home (a distance at least about 10 feet is desirable for the electronic configuration shown in the FIGS.), to avoid entry of the signal through the walls.

Preferably, where the boundary wire crosses an asphalt driveway or sidewalk, the wire is placed in a ½ inch deep cut in the asphalt surface (made using a circular saw equipped with a masonry blade), and the cut is sealed with an asphalt sealer. Where it crosses concrete driveways or sidewalks, the wire can be placed in an expansion joint and sealed. Where it crosses gravel driveways, the wire can be enclosed in a non-metallic conduit, such as a garden hose, and buffed. The wire can be laid beneath rocks, brick or flagstone without affecting the signal.

The user should determine where the inside edge of the signal field is to be, and mark the location with flags, preferably at intervals no greater than about 6 feet. The flags mark the edge of the signal field and act as a visual aid for the user and the animal during conditioning exercises. The wire will be placed about 8–10 feet beyond the line of flags.

The wire may be buffed, placed on the ground surface, or attached to an existing fence.

If the wire is to be buffed, the path it is to take should first be cleared of rocks, roots, underground cables, pipes, etc., and then a narrow groove is cut 3–4 inches deep using a straight edged spade or lawn edger. The boundary wire is then pressed into the groove and covered completely.

Each end of the transmitter lead is then connected to the boundary wire and wrapped using electrical tape.

System Test

The system can be tested after installation and before use as follows. The power switch is turned to "on", whereupon the red power indicator light and the green loop indicator light on the transmitter enclosure will come on. The radio signal can be tested by holding the test light pressed across the electrodes on the receiver and carrying the receiver towards the boundary wire at numerous places along the boundary.

The system can be adjusted as described below in the description of the conditioning exercises.

Animal Conditioning Protocol

The system can operate most effectively if at first the user works with the animal according to a conditioning protocol. The following is a protocol that has proven effective, safe and humane for conditioning a dog to respond to the stimuli (sound, shock) delivered as the dog approaches near the boundary defined by the wire—that is, to condition the animal to respect and remain within the designated boundary. This example shows use of apparatus installed as described in the forgoing paragraphs.

The conditioning should be carried out in a spirit of fun, and the user should maintain an upbeat, positive attitude throughout. The animal must understand that the user is the leader and the animal is the follower and, as leader, the user must be fair and consistent to maintain the animal's spirit.

A minimum of seven days should be allowed to elapse before allowing the animal into the restricted space without a lead. Conditioning exercises should be kept short, preferably about ten minutes. For dogs, the protocol appears most effective if the animal is at least six months old, and trained to sit and walk properly on a lead before being introduced to the apparatus according to the invention. If the user has more than one animal, each should be conditioned separately.

The conditioning operates according to principles of escape/avoidance conditioning. General, the conditioning constitutes teaching the animal to avoid an unpleasant sensation (electric shock) by remaining within a space defined by established boundaries.

To understand the recommended protocol for conditioning the animal to stay within the boundary defined by the wire loop, it can be helpful to think of the boundary as defining three zones, namely, a "safety" zone, an "avoidance" zone, and a "prohibited" zone. The safety zone is the space within which the animal is free to play. The avoidance zone is the space within the signal field created by the boundary wire. The prohibited zone is the space beyond the boundary. When the animal moves into the signal field the receiver collar emits an audible warning followed by electrical shock stimulation. The audible warning is the "cue", and the electrical shock stimulation is the "aversive". The objective of the conditioning is to teach the animal to respond to the cue by retreating to the safety zone.

Once the apparatus is installed, as described above, the following steps should be taken preliminary to beginning the conditioning.

Set the range. The signal field should be set, using the range selector on the transmitter enclosure, for a range of 8–10 feet. After the setting is made, the user can confirm the actual range by approaching the boundary wire while holding the receiver collar with a test light [described]. At the edge of the range as the user crosses into the avoidance zone the collar will emit the audible signal, and the test lamp will light. This test should be carried out when the animal is not present.

Set the rate. The shock rate should be set at a medium rate, by selecting level "2" using the shock rate selector on the transmitter enclosure.

Set the mode. The mode should be set to provide both the audible signal and the shock stimulation by setting the mode selector at "on".

Mount the receiver on the animal and adjust the collar. The collar should be adjusted sufficiently tight that both electrode contact points are close enough to the animal's skin (preferably touching it) to permit delivery of the shock stimulation. Additionally, the collar should be sufficiently tight that the rubbing of the contact posts on the skin, which may cause irritation, is minimized. If the animal has long hair, longer contact posts can be installed on the collar.

Once the installation and preliminary setup steps have been completed, the conditioning itself proceeds according to a series of exercises, carried out daily.

Day one. The animal should wear its customary collar in addition to the collar carrying the receiver, and the regular collar should be positioned below the receiver collar on the animal's neck. The animal's customary lead should be attached to the customary collar as usual, and then the user should play with the animal for two or three minutes. Then the user should walk the animal on the lead around the space near the boundary but within the safety zone. Then, the user should approach a training flag, hold the animal in one hand, and shake the flag with the other hand, telling the animal firmly, "No!, No!".

Next the user should return the animal to the center of the safety zone, and then walk it around the space near the boundary, allowing it to enter the avoidance zone between two of the warning flags. When the animal enters the avoidance zone, the receiver will deliver an audible warning and electrical stimulation. The user should immediately yell, "Watch out!" and quickly pull the animal back into the safety zone. The animal must not be permitted to cross over the boundary wire.

Electrical stimulation has long been recognized as a safe and effective part of dog training. Different dogs respond differently when they feel mild electrical stimulation, and some dogs may yelp and/or jump back. The user should not attempt to comfort the animal after it receives electrical stimulation.

Then the user should praise the animal and play with it within the safety zone for a few minutes. This play therapy phase reinforces a message that only a portion of the yard is to be avoided. If the animal enjoys retrieving, the user should toss it a couple of retrieves. After a few minutes of play the user should walk the animal, on the lead, around the entire boundary, staying within the safety zone. Then the user should take the animal inside and remove the receiver. This completes the first day's conditioning exercises.

Day two. The user should begin the exercise by mounting the receiver onto the animal as before, taking the animal outside to play for two or three minutes, then walking it him around the entire boundary, staying within the safety zone.

The user should then allow the animal to walk into the avoidance zone at a location different from the one used for the conditioning exercise the day before. If the animal retreats from the avoidance zone when it hears the warning sound, the user should praise it, in the safety zone, for a minute or two. Then the exercise should be repeated at still another location within the avoidance zone.

If the animal ignores the audible warning and receives electrical stimulation, the user should yell, "Watch out!" and pull the animal back to well within the safety zone. The user's yell reinforces the message that the avoidance zone is dangerous, and a note of anxiety in the user's voice during the yell can be very important. Then the user should praise the animal and play with it for two or three minutes in the safety zone, pausing on two or three occasions during the play to shake a training flag and say, "No! No!". Then the user should bring the animal inside and remove the receiver, ending the exercise for day two.

Day three. The user should mount the receiver on the animal and take it outside as on the previous day. The day two exercises should be repeated, at several different locations. The user should not call or other wise encourage the animal to enter the avoidance zone.

Day four. The user should mount the receiver on the animal and take it outside as on the previous day. After playing with the animal for a couple of minutes, the user should walk it around the safety zone on the lead.

While the user is walking the animal around, an assistant such as a friend or neighbor should by prior arrangement appear outside the boundary wire in the prohibited zone. As the user returns to the starting point of the walk with the animal, the user should pass by the assistant, without speaking, remaining within the safety zone. If the animal approaches the assistant and enters the avoidance zone, the user should allow it to receive electrical stimulation, repeat the "Watch out!" procedure as before, and pull the animal back to well within the safety zone. Then the assistant should leave. The animal should not be permitted to cross over the boundary wire.

Then the user should again walk the animal around the boundary and the assistant should appear again. If the animal makes no attempt to go to the assistant, the exercise should at that point be brought to an end. If the animal enters the avoidance zone again, the user should reset the rate to "3" and repeat the exercise. The user should end the day's training by praising and playing with the animal for two or three minutes, walking it around the safety zone, and bringing it inside and removing the receiver.

Day five. On day five, the exercise with the assistant should be carried out as on day four, and additionally the user should talk to the assistant across the boundary wire. The user should walk the animal on the lead around the boundary within the safety zone, while the assistant walks along, remaining 15-20 away from and outside the boundary wire. When the exercise is finished the user ends the day's conditioning by playing with the animal, bringing it inside and removing the receiver.

Day six. On day six, the exercise should be carried out as on day five, but substituting a family member as the assistant.

Day seven. Day seven should be a day of rest for the user and the animal, and both should take the day off from conditioning.

Days eight through fourteen. During these days, the animal may be permitted to go off the lead while the user is outside with it. If the animal respects the avoidance zone during this period, the animal may be permitted to venture outside by itself beginning on day fifteen. During the eighth through the fourteenth day, friends should be arrangement drop by, enter the safety zone, and talk with the user while petting the animal. The user should also during this time talk with a neighbor "over the fence". The neighbor should be on his property, and the user and the animal should remain within the safety zone. By the end of the fourteenth day, the animal should be thoroughly conditioned to respect the boundary.

The user may begin taking down the training flags during this period, "thinning" the flags on successive days.

Once the animal has been thoroughly conditioned to respect the boundary, the user may begin to venture beyond the boundary with the animal. During the first month after the conditioning has begun, the animal should be permitted to leave the safety zone only by travelling in the user's automobile. The user should remove the receiver, put the animal into the automobile within the safety zone, then drive the animal in the car across the boundary and off the property.

After the first month the animal can be walked across the boundary in the following manner. The user should bring the animal, on a lead, to a designated location at the edge of the signal field, remove the receiver, and tell the animal to "Wait", or "Stay" while the user crosses the boundary. Then the user should allow the animal to cross the boundary on the lead, using a release word, such as "OK". The designated location should thereafter consistently be used as the designated place for crossing, and the animal should be on a lead whenever crossing the boundary.

System Maintenance

Once the conditioning has been complete, and the animal has demonstrated a complete respect for the boundary, the user need ordinarily not further supervise the animal. The collar should be kept adjusted and the battery in the receiver should be regularly tested, and the electrode contact posts should be kept clean. Retrieving objects should not be thrown into the avoidance zone, nor should the animal be in any fashion invited to enter the avoidance zone or permitted to cross the boundary.

In the event that the system fails to limit the movement of the animal—that is, if the animal escapes beyond the boundary, the following should be considered. The animal may not have been trained properly. The receiver battery may be depleted; the receiver collar may be too loose; the transmitter may not be switched on, or may be inoperative; the boundary wire may be broken; the receiver may not be operating properly; the range setting may be too low, so that the signal field is too narrow; the rate level may be too low to provide an effective aversive shock stimulus;

In one preferred embodiment the transmitter is provided with a light indicating that the power is on, and with a light and/or a buzzer indicating electrical continuity in the wire loop. If the power indicator light is not on, the transmitter may not be connected to an appropriate live line current, or it may not be switched on. If the loop light is not on or the transmitter is buzzing, the boundary wire is unplugged or broken.

If the receiver may not be operating, it can be tested using the test light, as described above; if it fails the test, then the battery may not be fresh or may be incorrectly installed. If the receiver passes the test, then the collar may be too loose, or the contact posts may not be long enough to reach through the animal's fur near enough to the animal's skin to deliver the shock stimulus; the posts can simply be replaced with longer posts.

Other Embodiments

Other embodiments are within the following claims.

For example, the stimulation regime can be varied. Other stimulation types can be used, and particularly other stimuli can be substituted for an audible beep, although an audible beep is known to be particularly effective for controlling dogs; electric shock is well known as a conditioning stimulus, but once the particular animal has been conditioned to respect the boundary, the shock stimulus may be unnecessary, or a nonelectrical stimulus may be substituted for it. Alternative stimulation types include, for example, a release of a rapidly dispersing temporarily irritating substance such as, for example, ammonia, as a gas or aerosol. The receiver can be configured to count bursts and to deliver aversive stimuli not at every burst, but at intervals of some set number of bursts, for example. In the "on" mode, a time interval can follow each first aversive stimulus (such as an audible tone) before the shock is delivered.

Other configurations may be used for the coded transmitter signal. The pulse rate can be other than the approximately 8 kHz rate shown in the examples. Burst repetition rates (and, hence, stimulus frequencies) other than those illustrated can be used, and others may prove more effective for different breeds and types of animal's; rates as low as about 3 bursts per second and as high as about 300 bursts per second have been shown to be effective. A different range of selectable repetition rates can be provided. The intensity of each shock in the stimulus series can be different from that shown, although shocks at approximately 50V, delivering approximately 30 mA, appear to be effective for canines; currents in the range between about 1 mA and about 30 mA (particularly about 20 mA) have been shown to be effective. The shock energy and shock pulse shape can differ, particularly for different types and breeds of animal. Burst lengths other than those illustrated can be used to encode the mode "on", mode "off", and maximum length for non-pulse (interfering, effectively continuous-wave) signals.

It is possible that an animal may under some circumstances (for example, illness, or imperfect training) respond to the aversive shock stimulus by assuming a submissive posture, and remaining within the avoidance zone. Because the illustrative embodiment provides for continuous stimulation for as long as the animal remains within the avoidance zone, the animal may under these circumstances not leave the avoidance zone, and may if unattended in these circumstances be overstimulated. The stimulation regime can be altered to avoid such overstimulation by automatically switching from the "on" mode to an "off" mode after some period of continuous electrical shock stimulation, allowing the animal relief from long term repeated shock yet continuing to provide a nonelectrical aversive stimulus.

The switching options on the front end of the system may of course be varied, and the package configuration may be varied as may be convenient. The receiver package may be made smaller, for example, by using a smaller receiving antenna.

I claim:

1. An apparatus for confining the movement of an animal to a defined areas, comprising:
   a) a transmitter having means for generating a continuous, coded radio signal through an antenna defining said area, said means for generating said continuous, coded radio signal including
      i) means for modifying the amplitude of said continuous, coded radio signal, and
      ii) means for modifying the code of said continuous, coded radio signal, thereby modifying the type and rate of a stimulus provided to said animal;
   b) a portable radio receiver for detecting the amplitude of the continuous, coded radio signal and for decoding said continuous, coded radio signal for the rate and type of stimulus provided to said animal;
   c) means for delivering said stimulus to said animal in response only to said detected continuous, coded radio signal; and
   d) means for attaching to said animal said portable radio receiver and said means for delivering said stimulus.

2. An apparatus of claim 1 wherein means for delivering said stimulus to said animal is selected from a group consisting of a loudspeaker and electrodes.

3. An apparatus of claim 2 wherein said stimulus is selected from a group consisting of an auditory stimulus, an electrical stimulus and an auditory stimulus followed by an electrical stimulus.

4. An apparatus of claim 3 wherein means for modifying the code of said continuous, coded radio signal for delivery to the animal is selected from a group of slow, medium and fast shock rates.

5. An apparatus of claim 4 wherein the slow shock rate is about four bursts per second, said bursts having a period of about 125 microseconds.

6. An apparatus of claim 4 wherein the medium shock rate is about thirty bursts per second, said bursts having a period of about 125 microseconds.

7. An apparatus of claim 4 wherein the fast shock rate is about sixty bursts per second, said bursts having a period of about 125 microseconds.

8. An apparatus of claim 3 wherein means for delivering said stimulus to said animal further includes means for spraying an irritating substance.

9. An apparatus of claim 8 wherein means for spraying irritating substance is aerosol spray.

10. An apparatus of claim 9 wherein the irritating substance is ammonia gas.

11. An apparatus of claim 3 wherein means for delivering stimulus can be automatically switched from said electrodes to said loudspeaker after a predetermined period of continuous electrical simulation.

12. An apparatus of claim 3 wherein means for delivering stimulus can be turned on and off by the continuous, coded radio signal.

13. An apparatus of claim 1 wherein the antenna is a perimeter wire.

14. An apparatus of claim 1 wherein the continuous, coded radio signal is an AM radio signal.

15. An apparatus for confining the movement of an animal to a defined area, comprising:
   a) a transmitter having means for generating a continuous, coded radio signal through a perimeter wire defining said area, said means for generating said continuous, coded radio signal including
      i) means for modifying the amplitude of said continuous, coded radio signal, and
      ii) means for modifying the code of said continuous, coded radio signal, thereby modifying the type and rate of a stimulus provided to said animal;
   b) a portable radio receiver for detecting the amplitude of the continuous, coded radio signal and for decoding said continuous, coded radio signal for the rate and type of stimulus provided to said animal;
   c) means for delivering said stimulus, which includes a loudspeaker and electrodes, to said animal in response only to said detected continuous, coded radio signal; and
   d) means for attaching to said animal said portable radio receiver and said means for delivering said stimulus.

16. An apparatus for confining the movement of an animal to a defined area, comprising:
   a) a transmitter having means for generating a continuous, coded radio signal through an antenna defining said area, said means for generating said continuous, coded radio signal including
      i) means for modifying the amplitude of said continuous, coded radio signal, and
      ii) means for modifying the code of said continuous, coded radio signal, thereby modifying the type and rate of a stimulus provided to said animal, wherein said stimulus includes an electrical stimulus and an auditory stimulus;
   b) a portable radio receiver for detecting the amplitude of the continuous, coded radio signal and for decoding said continuous, coded radio signal for the rate and type of said stimulus provided to said animal;
   c) means for delivering said stimulus to said animal in response only to said detected continuous, coded radio signal, wherein said means for delivering stimulus can be automatically switched from the electrical stimulus to the auditory stimulus after a predetermined period of continuous electrical stimulation; and
   d) means for attaching to said animal said portable radio receiver and said means for delivering said stimulus.

* * * * *